US 7,072,678 B2

(12) United States Patent
Allison

(10) Patent No.: US 7,072,678 B2
(45) Date of Patent: Jul. 4, 2006

(54) METHODS AND SYSTEMS FOR TRIGGERLESS MOBILE GROUP DIALING

(75) Inventor: Rick L. Allison, Cary, NC (US)

(73) Assignee: Tekelec, Calabasas, CA (US)

( * ) Notice: Subject to any disclaimer, the term of this patent is extended or adjusted under 35 U.S.C. 154(b) by 47 days.

(21) Appl. No.: 10/718,292

(22) Filed: Nov. 20, 2003

(65) Prior Publication Data

US 2005/0113095 A1 May 26, 2005

(51) Int. Cl.
*H04B 7/00* (2006.01)
*H04Q 7/20* (2006.01)

(52) U.S. Cl. .................. 455/518; 455/417; 455/461; 455/462; 455/519; 455/551; 455/555; 379/221.1

(58) Field of Classification Search ............... 455/417, 455/432.2, 461, 462, 518, 519, 551, 555; 379/201.01, 221.08, 221.09, 221.13, 88.22, 379/221.1
See application file for complete search history.

(56) References Cited

U.S. PATENT DOCUMENTS

| 5,404,395 | A | | 4/1995 | Bogart et al. |
| 5,418,844 | A | * | 5/1995 | Morrisey et al. ...... 379/221.09 |
| 5,481,603 | A | * | 1/1996 | Gutierrez et al. ...... 379/221.09 |
| 5,835,583 | A | | 11/1998 | Hetz et al. |
| 6,055,302 | A | * | 4/2000 | Schmersel et al. ..... 379/201.01 |
| 6,076,121 | A | * | 6/2000 | Levine .......................... 710/62 |
| 6,161,012 | A | * | 12/2000 | Fenton et al. ............. 455/432.2 |
| 6,185,289 | B1 | | 2/2001 | Hetz et al. |
| 6,285,753 | B1 | | 9/2001 | Slusher |
| 6,453,018 | B1 | | 9/2002 | Henry et al. |
| 6,639,981 | B1 | | 10/2003 | Dunn, Jr. et al. |
| 6,647,113 | B1 | * | 11/2003 | McCann et al. ........ 379/221.13 |
| 6,718,018 | B1 | * | 4/2004 | Henry et al. .............. 379/88.22 |
| 6,728,361 | B1 | * | 4/2004 | Ouyang ................... 379/221.08 |
| 2002/0054674 | A1 | | 5/2002 | Chang et al. |
| 2002/0115441 | A1 | * | 8/2002 | Alonso et al. ............... 455/445 |

(Continued)

FOREIGN PATENT DOCUMENTS

WO    WO 97/37502    10/1997

(Continued)

OTHER PUBLICATIONS

Commonly-assigned, co-pending U.S. Appl. No. 11/106,057 for "Methods, Systems, and Computer Program Products for Providing Triggerless Mobile Services," (Unpublished, filed Apr. 14, 2005).

*Primary Examiner*—Steve M. D'Agosta
(74) *Attorney, Agent, or Firm*—Jenkins, Wilson, Taylor & Hunt, P.A.

(57) ABSTRACT

Methods and systems for triggerless mobile group dialing are disclosed. A method for triggerless mobile group dialing includes intercepting call signaling messages that contain mobile dialing codes. For these call signaling messages, a mobile dialing group ID is determined based on the calling party address in the mobile call signaling messages if the mobile call signaling messages contain calling party addresses. The mobile dialing group ID and the mobile dialing code are used together to determine a full called party address for each of the signaling messages. In lieu of using a mobile dialing group ID, a method is also presented for directly associating combinations of full E.164 calling party address digits and mobile dialing codes to full E.164 called party address digits. The full called party address is inserted in each of the signaling messages and each message is routed to its intended destination.

57 Claims, 7 Drawing Sheets

U.S. PATENT DOCUMENTS

| | | |
|---|---|---|
| 2002/0181673 A1 | 12/2002 | Henry et al. |
| 2003/0091170 A1 | 5/2003 | McCann et al. |
| 2004/0095889 A1 | 5/2004 | Chang et al. |

FOREIGN PATENT DOCUMENTS

| | | |
|---|---|---|
| WO | WO 99/51008 | 10/1999 |
| WO | WO 00/60839 | 10/2000 |
| WO | WO 02/07456 | 1/2002 |
| WO | WO 02/058417 A1 | 7/2002 |
| WO | WO 03/017697 | 2/2003 |
| WO | WO 2004/047459 | 6/2004 |

* cited by examiner

METHODS AND SYSTEMS FOR TRIGGERLESS MOBILE GROUP DIALING

TECHNICAL FIELD

The present invention relates to methods and systems for associating dialing codes with subscribers in a mobile communications network. More particularly, the present invention relates to methods and systems for triggerless mobile group dialing where mobile and wireline subscribers can use customizable dialing codes to contact mobile subscribers without requiring specialized switching office equipment or intelligent network (IN) triggers.

RELATED ART

In wireline telecommunications networks, private branch exchanges (PBXs) are scaled-down versions of central office switches owned by private organizations (versus a public telephone company). One feature provided by PBXs is to allow members of a group or organization to dial shortened versions of other member's full E.164 directory numbers. In the United States, these short dialing codes are typically the last four digits of the seven- or ten-digit E.164 telephone number.

Using these short dialing codes eliminates the need for group members to remember the full seven- or ten-digit E.164 telephone number in order to contact other group members. However, one problem with PBX-based group dialing models is that they require the private organization to lease or purchase a PBX. In addition, PBXs are limited to use with wireline phones. Finally, the short codes dialable in a PBX-based network are typically assigned by the network and are not customizable.

Another example in wireline communications networks in which short codes are used to access full directory numbers is N11 services, such as 911 or 411 services. In wireline telecommunications networks, when a subscriber dials an N11 code, such as 411, the originating end office switch formulates a query to a database in order to determine the service being requested by the subscriber. The database returns a response that instructs the switch on how to route or process the call. The end office switch is required to implement a trigger to recognize the N11 code, formulate the query, suspend call processing until the response arrives, and process the call in accordance with the response. Requiring switching-office-based triggers to enable short code dialing increases the processing load on switches and increases call setup time.

In mobile communications networks, mobile virtual private networks (VPNs) are beginning to provide PBX-like services to mobile users. However, like the above-described IN-based query model for wireline networks, VPNs require queries and responses to databases in order to determine how to process a call when the caller dials a short code. For example, VPNs may follow INAP or CAMEL models, which require the originating switch to have a trigger that detects a short code, suspend the call setup process, and launch an INAP or CAMEL query to a database in order to determine how to process the call. As described above, the suspension of the call setup process increases call setup time. The required IN processing increases signaling message traffic in the network and the processing load on originating switches. In addition, the dialing codes used to access supplemental services are typically not customizable.

Accordingly, in light of these difficulties associated with mobile dialing codes, there exists a need for improved methods and systems for associating dialing codes with mobile subscribers in a telecommunications network.

DISCLOSURE OF THE INVENTION

The present invention includes methods and systems for associating mobile dialing codes with mobile subscribers in a telecommunications network. A mobile dialing code may be a shortened version of a subscriber's full directory number or any other code that a mobile or wireline subscriber desires to associate with a mobile subscriber. For example, a mobile dialing code may be the last four digits of the mobile subscriber's MSISDN number. The mobile dialing codes are preferably customizable by end users. Each mobile dialing code may be associated with a mobile dialing group so that dialing codes need not be unique outside of a mobile dialing group, resulting in increased mobile dialing code customizability.

The terms "mobile dialing code" and "short code" are used interchangeably herein. Each of these terms is intended to refer to a code assigned by a mobile or wireline subscriber to contact a mobile subscriber via a mobile telecommunications network.

According to one aspect of the invention, a signal transfer point routes call signaling messages between entities in a mobile communications network and triggerlessly intercepts messages that contain mobile dialing codes. For example, signal transfer point may intercept a mobile call signaling message requesting the location of a mobile subscriber. The mobile call signaling message may include a mobile dialing code used to identify a mobile subscriber within a mobile dialing group. The signal transfer point may translate the mobile dialing code into a directory number, such as an MSISDN, and replace the mobile dialing code with the called party directory number in the mobile call signaling message. The signal transfer point may then route the mobile call signaling message to an HLR where the subscriber location information is obtained based on the full directory number for the called mobile subscriber. The HLR may then respond to the mobile call signaling message, giving the originating switch information to route the call to the called mobile subscriber.

Because the present invention is capable of routing calls to a mobile subscriber based on mobile dialing codes without requiring end office triggers, call setup time is decreased over conventional IN- or CAMEL-based implementations that require database queries and responses. In addition, because end office triggers are not required, suspension of call processing is not required, and the processing load on originating switches is decreased.

In order to translate mobile dialing codes into called party directory numbers, the signal transfer point may obtain mobile dialing group information from call signaling messages. In one implementation, the signal transfer point may include a database that maps calling party numbers to dialing group identifiers and that maps dialing codes to E.164 numbers within each dialing group. In this implementation, the signal transfer point may receive calling party information in mobile subscriber send routing information or location request messages. This implementation assumes that the originating end office supports calling party information in mobile subscriber send routing information or location request messages. The calling party information is needed for one of two purposes: 1) In the case that short codes are divided into mobile dialing groups, the calling party information is used to map to the specific dialing group ID that should be used to translate the short code. 2) In the case the direct calling party+short code-to-called party mapping is performed, the calling party information is needed in combination with the short code to provide a mapping to the full called party number.

In an alternate implementation where the originating end offices do not insert calling party information in mobile subscriber send routing information or location request messages, the database in the signal transfer point may include information that maps mobile dialing codes to GMSC IDs. The signal transfer point may insert the GMSC ID in a response to a send routing information or location request message to trigger the originating end office to send an IAM message to a GMSC. The IAM message includes the calling party address and the dialed short code. The signal transfer point intercepts the IAM message and uses the calling party address and the short code to obtain the full called party E.164 number. The signal transfer point modifies the IAM message by replacing the short code with the full called party E.164 address and forwards the IAM message to the GMSC. The call is then completed to the called party end office via the GMSC using normal call setup procedures.

Accordingly, it is an object of the invention to provide methods and systems for triggerlessly associating mobile dialing codes with individual mobile subscribers within a mobile dialing group.

It is another object of the invention to provide methods and systems for allowing end users to customize mobile dialing codes within mobile dialing groups.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Figure 1:
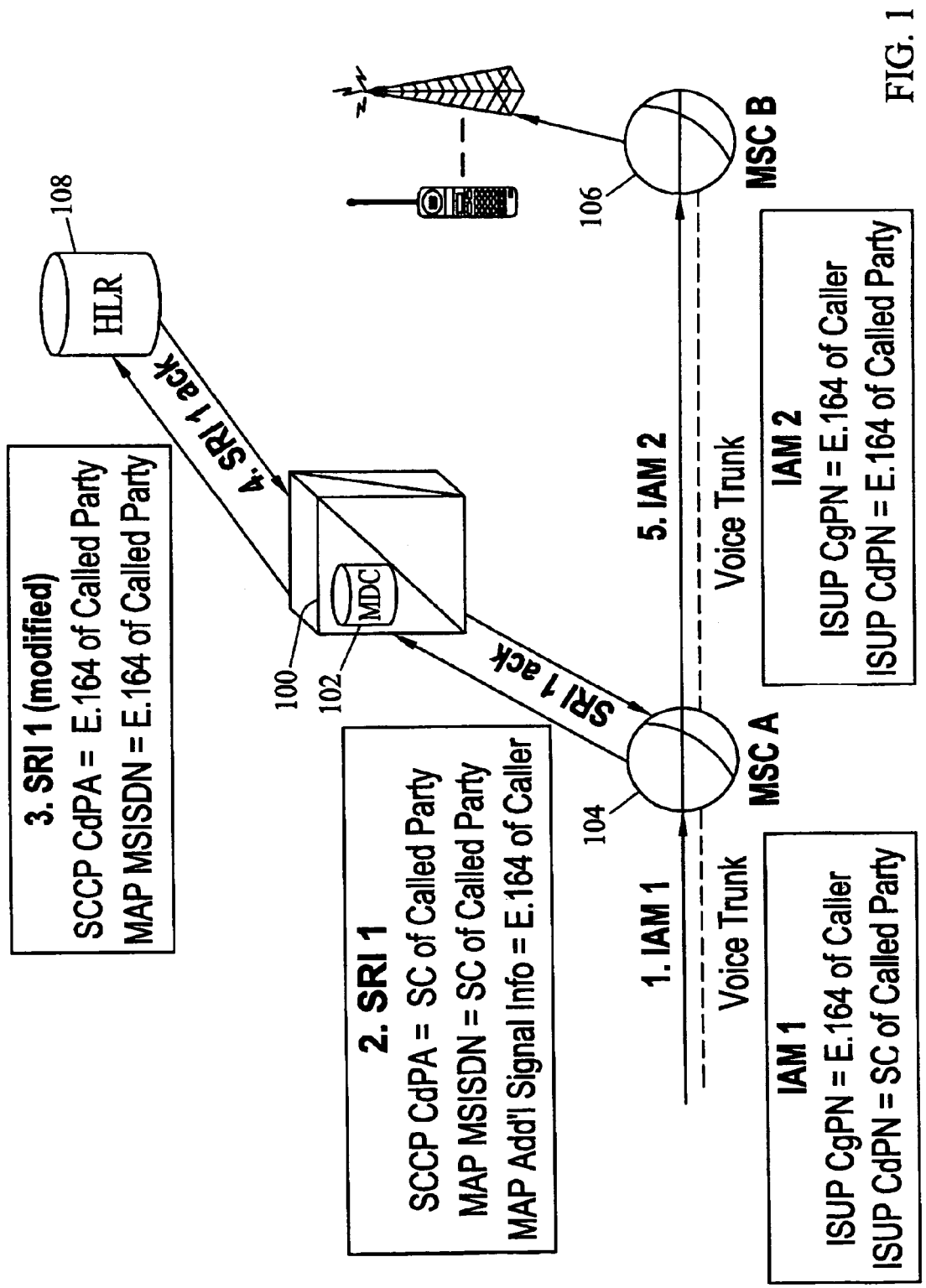
FIG. 1 is a network diagram illustrating exemplary call signaling for triggerless mobile group dialing in a GSM network supporting calling party digits in SRI messages according to an embodiment of the present invention.

The present invention implements triggerless mobile group dialing in a variety of different types of mobile communications networks, such as GSM networks and IS-41 networks. FIG. 1 illustrates triggerless mobile group dialing in a GSM network where the GSM MSC supports calling party digits in SRI messages. In FIG. 1, the network includes a signal transfer point 100 including functionality for intercepting signaling messages relating to calls to mobile dialing groups and a mobile dialing code database 102 for mapping mobile dialing codes to full directory numbers. The network illustrated in FIG. 1 also includes GSM MSCs 104 and 106 and an HLR 108.

In FIG. 1, it is assumed that GSM MSC 104 has the capability of including calling party information in send routing information (SRI) messages that it sends to HLR 108. According to 3GPP TS 29.002, Mobile Application Part (MAP) Specification (Release 1999), v. 3.14.0, September 2002 (hereinafter, "the GSM MAP specification"), calling party digits can optionally be included in an SRI message. In the present embodiment, it is assumed that MSC A 104 is capable of extracting calling party digits from an IAM message and inserting the calling party digits into an SRI message.

The call flow illustrated in FIG. 1 illustrates exemplary signaling messages that may be used to implement triggerless mobile group dialing. In the call flow, a call is assumed to originate either from a wireline network or another mobile communications network. It is assumed that the caller dials a mobile dialing code used to identify the called subscriber within a mobile dialing group. Accordingly, in step 1, the originating switch formulates an IAM message IAM 1 and sends the message to MSC A 104. The IAM message stores the short code that the caller used to identify the called party and E.164 address of the caller.

When the IAM message arrives at MSC A 104, in step 2, MSC A 104 generates an SRI message in order to locate the called subscriber. In the SRI message, the SCCP called party address is set to the dialed short code of the called party, the MAP MSISDN parameter is also set to the dialed short code of the called party. The optional MAP additional signal info parameter is set to the full E.164 number of the person originating the call. MSC A 104 sends the SRI message to HLR 108 via STP 100. The message may be addressed to the point code of HLR 108, or the message may be global title routed to HLR 108.

When STP 100 receives the SRI message, rather than simply routing the message to HLR 108, STP 100 intercepts the message and determines a mobile dialing group ID corresponding to the calling party information in the SRI message. STP 100 uses the mobile dialing group ID in combination with the mobile dialing code from the SCCP CdPA or MAP MSISDN to extract the full E.164 MSISDN number of the called subscriber. STP 100 then inserts the MSISDN number in the SCCP called party address and MAP MSISDN parameter of the message and forwards the SRI message to HLR 108. In step 3, STP 100 sends the modified SRI message to HLR 108.

The present invention is not limited to using a mobile dialing group ID from the calling party address to extract the full called party address. In an alternate implementation, the present invention may simply use the calling party address in combination with the short code to extract the full called party address. In such an implementation, individual calling party addresses or ranges of calling party addresses may be used as mobile dialing group codes or identifiers. It is not necessary to determine a separate mobile dialing group code. This approach has some advantages over the use of Group IDs in that each individual subscriber can have any number of parties within their short code "group", but those parties do not all have to have the same parties within their "groups". For example, a caller with E.164 number 9194611000 could have two parties that he can dial with short codes 123 and 456. These short codes could correspond to 9193808888 and 9193881416, respectively. The combination of 919461100+123 translates to 9193808888, while 9194611000+456 translates to 9193881416. These may be the only two parties in this caller's short code "group". However, caller 9193808888 may have 3 short codes in his group 123, 456 and 789. These short codes could correspond to 9194667979, 9194356666, and 9194611000, respectively. Thus, the combination of 9193808888+123 translates to 9194667979; 9193808888+456 translates to 9194356666; and 9193808888+789 translates to 9194611000. It can be seen that caller 9194611000 has short code dialing capabilities to caller 9193808888, but he does not have short code dialing capabilities to caller 9194667979. However, caller 9193808888 does have short code capabilities to caller 9194667979. With the use of static Dialing Group IDs, this would not be possible.

HLR 108 receives the SRI message, locates the corresponding subscriber record, extracts the location information where the subscriber is roaming, and formulates an SRI ACK message. In step 4, HLR 108 forwards the SRI ACK message to MSC A 104 via STP 100. STP 100 relays the SRI ACK message to MSC A 104 via MTP or global title routing.

When MSC A receives the SRI ACK message, MSC A 104 uses information in the message to formulate an initial address message IAM 2 where the called party address is set to the full E.164 MSISDN number of the called party. The calling party address is set to the full E.164 number of the calling party. In step 5, MSC A 104 forwards the IAM message IAM 2 to MSC B 106. A voice trunk is also established between MSC A 104 and MSC B 106. Once MSC B 106 receives the IAM message IAM 2, MSC B 106 initiates procedures to complete the call to the mobile subscriber over the radio network.

Thus, using the steps illustrated in FIG. 1, an STP with a mobile dialing code database is capable of routing calls addressed to mobile dialing codes to the proper called party. By performing the translation at an STP and modifying the send routing information message, STP 100 avoids the need for queries and responses to SCP databases. As a result, call setup time and network signaling traffic are decreased.

Figure 2:
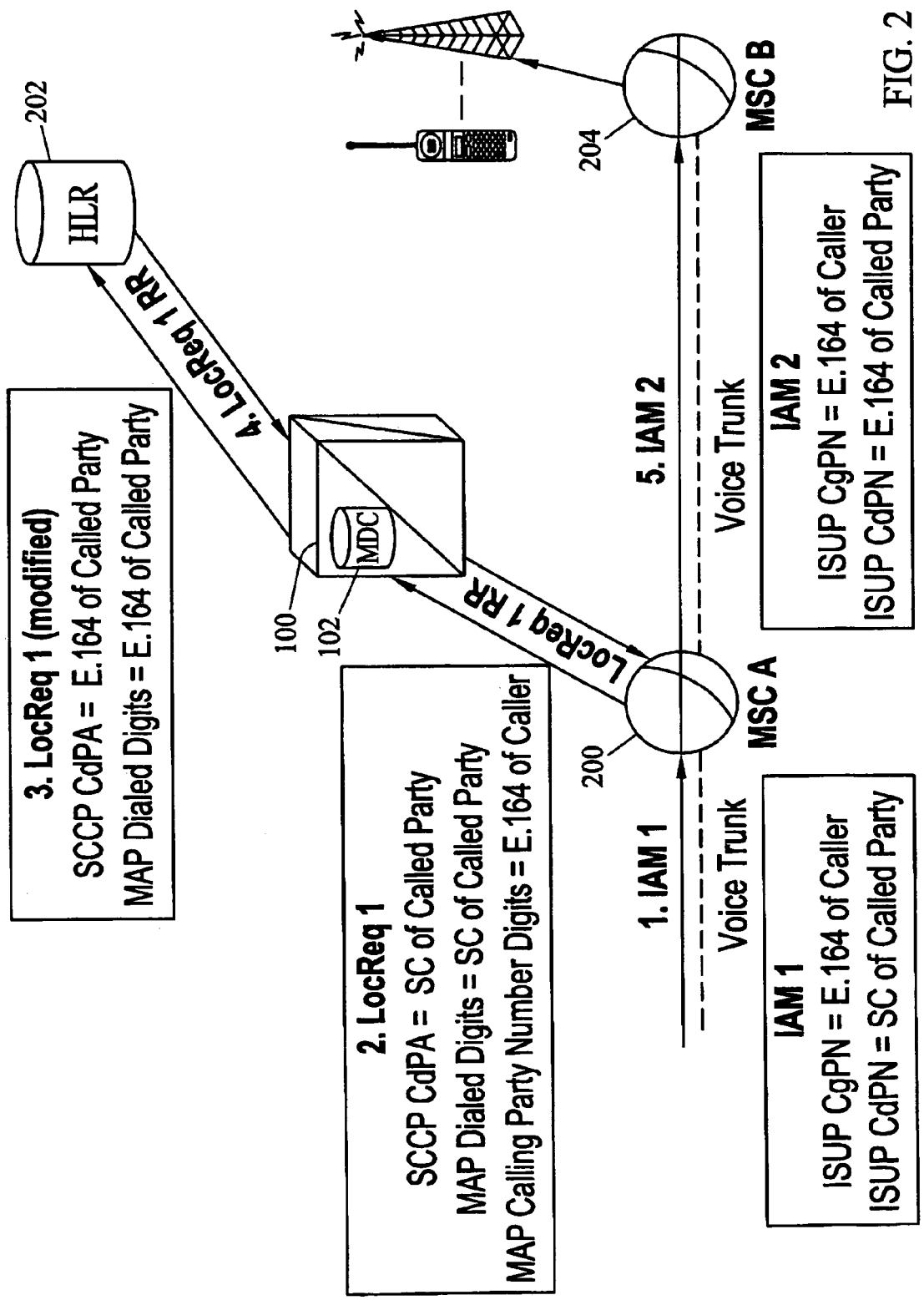
FIG. 2 is a network diagram illustrating exemplary call signaling for triggerless mobile group dialing in an IS-41 network supporting calling party digits in location request messages according to an embodiment of the present invention.

FIG. 2 illustrates exemplary mobile call signaling for routing calls to mobile dialing codes in an IS-41 network where the IS-41 MSC supports calling party dialed digits in location request messages. Referring to FIG. 2, it is assumed that a call is originated from a wireline telecommunications network or another mobile communications network. It is also assumed that the calling party dials a mobile dialing code. The first step in the call is the initial address message IAM 1 generated by the originating network. The IAM message IAM 1 arrives at IS-41 MSC A 200. In the IAM message, the called party number is set to the dialed short code, and the calling party number is set to the full E.164 number of the calling party. A voice trunk is also established between the originating network and MSC A 200.

In response to the IAM message, MSC A 200 formulates a location request message to determine the location of the called party (step 2). In the location request message, the SCCP called party address is set to the mobile dialing code of the called party, the MAP dialed digits parameter is also set to the mobile dialing code of the called party, and the optional MAP calling party number digits parameter is set to the full E.164 number of the calling party. MSC A 200 sends the location request message to IS-41 HLR 202 via STP 100.

In response to receiving the location request message, STP 100 recognizes the message as containing a mobile dialing code and intercepts the message. STP 100 then performs a lookup in database 102 to determine the mobile dialing group ID of the calling party. Once the mobile dialing group ID is determined, STP 100 uses the mobile dialing group ID and the mobile dialing code from either the SCCP CdPA or MAP MSISDN to determine the full E.164 address of the called party. Alternatively, as described above for the GSM case, STP 100 may omit the step of determining the mobile dialing group ID and determine the E.164 address of the called party based on calling party number and the short code.

STP 100 modifies the location request message by replacing the mobile dialing code in the SCCP called party address and MAP dialed digits parameters with the full E.164 number. In step 3, STP 100 forwards the location request message to HLR 202. In response to receiving the location request message, HLR 202 performs ANSI-41 call setup processing, which may include sending a MAP route request query to the serving VLR. In step 4, HLR 202 sends a location request return result message to MSC A 200 via STP 100. STP 100 relays the location request return result message to MSC A 200 using MTP or global title routing.

In response to receiving the location request return result message, MSC A 200 formulates an IAM message IAM 2 with the called party number set to the full E.164 number of the called party and the calling party number set to the full E.164 number of the calling party and sends IAM 2 to MSC B 204 (step 5). A voice trunk is reserved between MSC A 200 and MSC B 204. In response to receiving the IAM message IAM 2, MSC B 204 initiates procedures to complete the call on the radio network. Thus, in the example illustrated in FIG. 2, STP 100 triggerlessly routes IS-41 calls directed to mobile dialing codes without requiring specialized database queries or responses. As a result, mobile call setup time in IS-41 networks is reduced.

Figure 3:
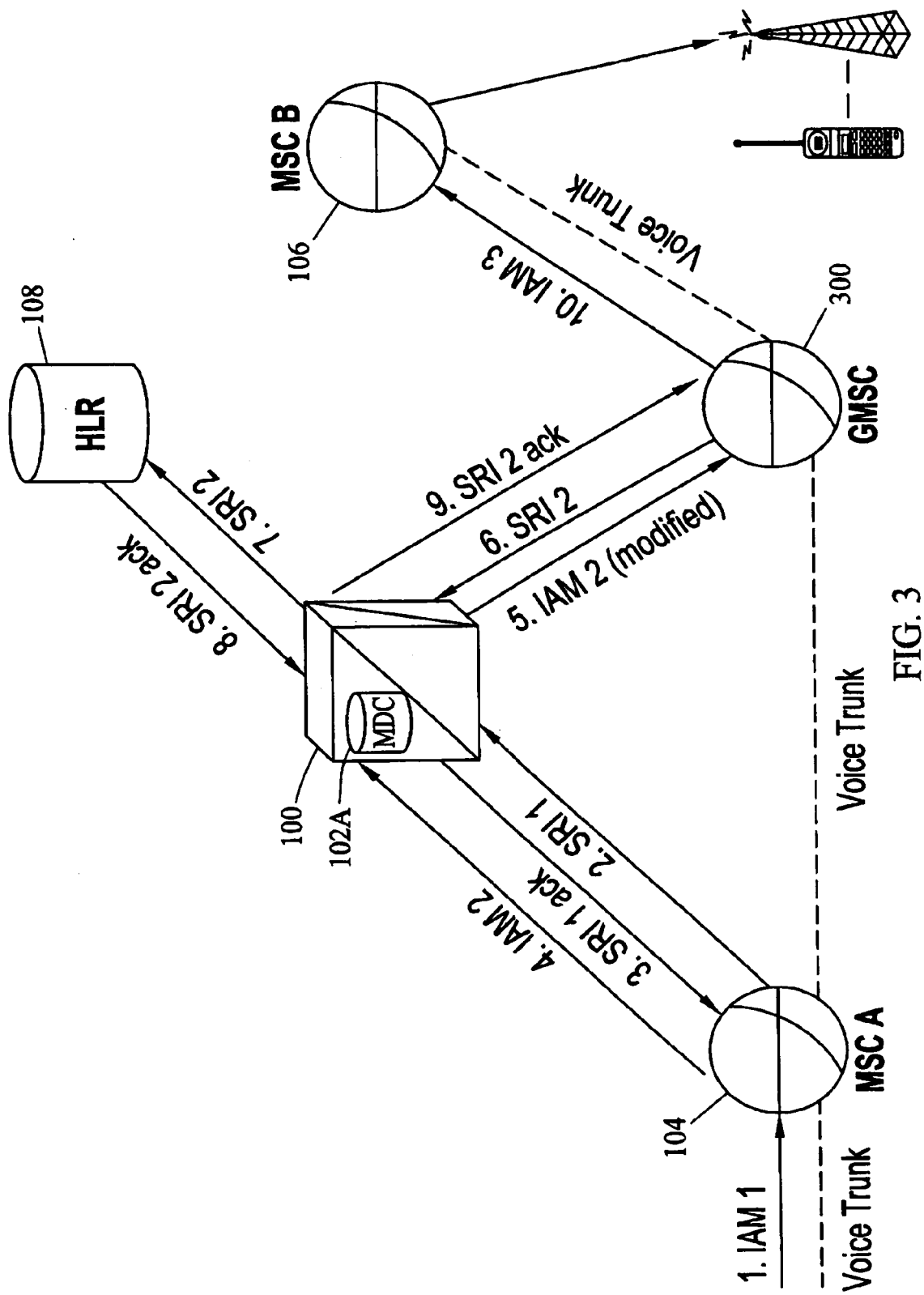
FIG. 3 is a network diagram illustrating exemplary call signaling for triggerless mobile group dialing in a network in which mobile switching centers do not support calling party digits in SRI or location request messages according to an embodiment of the present invention.

In the examples illustrated in FIGS. 1 and 2, it was assumed that the MSCs supported calling party dialed digits in SRI and location request messages. However, the present invention is not limited to performing triggerless mobile group dialing in such networks. The present invention may also perform steps for triggerless mobile group dialing in a network in which the mobile-switching centers do not support calling party dialed digits in SRI or location request messages. In this case, routing via an intermediate or transit GMSC is required because when MSC A sends an IAM via STP 100, it must also reserve a voice trunk to the next switch in the route. Because the HLR query has not taken place, and thus the current roamed-to MSC B has not been determined, it is not possible for MSC A to set up a voice trunk to the final switch destination (i.e. MSC B). Therefore, the GMSC is used as an intermediate hop that MSC A can use to set up a voice trunk while STP 100 performs the short code translation on the IAM. FIG. 3 is a network diagram of a GSM network and an associated message flow for performing triggerless mobile group dialing where the GSM MSCs do not support calling party dialed digits in SRI messages. Referring to FIG. 3, in step 1, MSC A 104 receives an IAM message IAM 1. The called party number of the IAM message is set to the dialed short code. The calling party number of the IAM message is set to the full E.164 address of the person originating the call. A voice trunk is also established to MSC A 104.

In step 2, MSC A 104 generates an SRI message SRI 1 and sends the SRI message to HLR 108. The called party number in the SRI message is set to the dialed short code. STP 100 intercepts SRI 1, and searches a short code-gateway MSC mapping table in a mobile dialing code database 102A using the short code retrieved from the called party parameter of the SRI. The result of the lookup is the E.164 address of gateway MSC 300.

In step 3, rather than routing the SRI message to HLR 108, STP 102A formulates an SRI ACK message and sends the SRI ACK message to MSC A 104. In the SRI ACK message, STP 100 sets the mobile subscriber routing number parameter equal to the GMSC ID located using the short code.

In response to receiving the SRI ACK, in step 4, MSC A 104 formulates and sends an IAM message IAM 2 to GMSC 300 via STP 100. IAM 2 contains a called party number parameter that is equal to the dialed short code and a calling party number that is equal to the E.164 number of the call originator. MSC A 104 also establishes a voice trunk to GMSC 300.

STP 100 intercepts IAM 2, searches the calling party-dialing group mapping table in database 102A with the E.164 number of the originating caller from the calling party number parameter and finds a match with the corresponding dialing group ID. STP 100 locates the correct short code-MSISDN mapping table in database 102A corresponding to the dialing group ID previously determined and searches this table with the short code from the called party number of IAM 2, and finds a match with the corresponding full E.164 MSISDN of the dialed subscriber. In step 5, STP 100 modifies IAM 2 by replacing the short code in the called party number parameter with the full E.164 MSISDN number found in the previous step and forwards IAM 2 to GMSC 300.

Upon receipt of the modified IAM 2, GMSC 300 generates a send routing information message SRI 2 with the called party number being equal to the E.164 MSISDN of the dialed subscriber (step 6). GMSC 300 routes SRI 2 to HLR 108 via STP 100. In step 7, STP 100 intercepts SRI 2, searches the short code-gateway MSC mapping table with the full E.164 MSISDN retrieved from the called party address parameter of the SRI. Since SRI 2 does not contain a short code, no match is found because the short code-gateway MSC mapping table may contain only short codes and not full E.164 numbers. Because a match is not found, STP 100 relays SRI 2 to HLR 108 via GTT or MTP routing.

HLR 108 receives SRI 2 and performs standard processing to find the currently roamed-to MSC. In step 8, HLR 108 returns an SRI 2 ACK message to GMSC 300 containing routing information in the MSRN parameter for MSC B 106.

In step 9, GMSC 300 receives SRI 2 ACK. In step 10, GMSC 300 formulates and sends an IAM message IAM 3 to MSC B 106 via STP 300. IAM 3 contains a called party number parameter being equal to the E.164 MSISDN number of the dialed subscriber and the calling party number being equal to the full E.164 number of the call originator. GMSC 300 also establishes a voice trunk to MSC B 106. MSC B 106 initiates procedures to complete the call on the radio network to the dialed subscriber.

Thus, in the example illustrated in FIG. 3, STP 100 uses a number of different tables in order to determine the called party corresponding to the dialed mobile dialing code. Because the SRI message does not include calling party number parameters, it is necessary for STP 100 to determine the calling party number in another manner. In the example illustrated in FIG. 3, the calling party number is determined by forcing MSC A 104 to send a second IAM message including the full E.164 address to route the call through GMSC 300.

Although the example illustrated in FIG. 3 illustrates triggerless mobile group dialing in a GSM network where the MSC does not support calling party digits in the SRI, it is understood that a similar procedure would be performed for an IS-41 network. That is, the SRI messages and SRI ACK messages would simply be replaced by location request and location request ACK messages.

Figure 4:
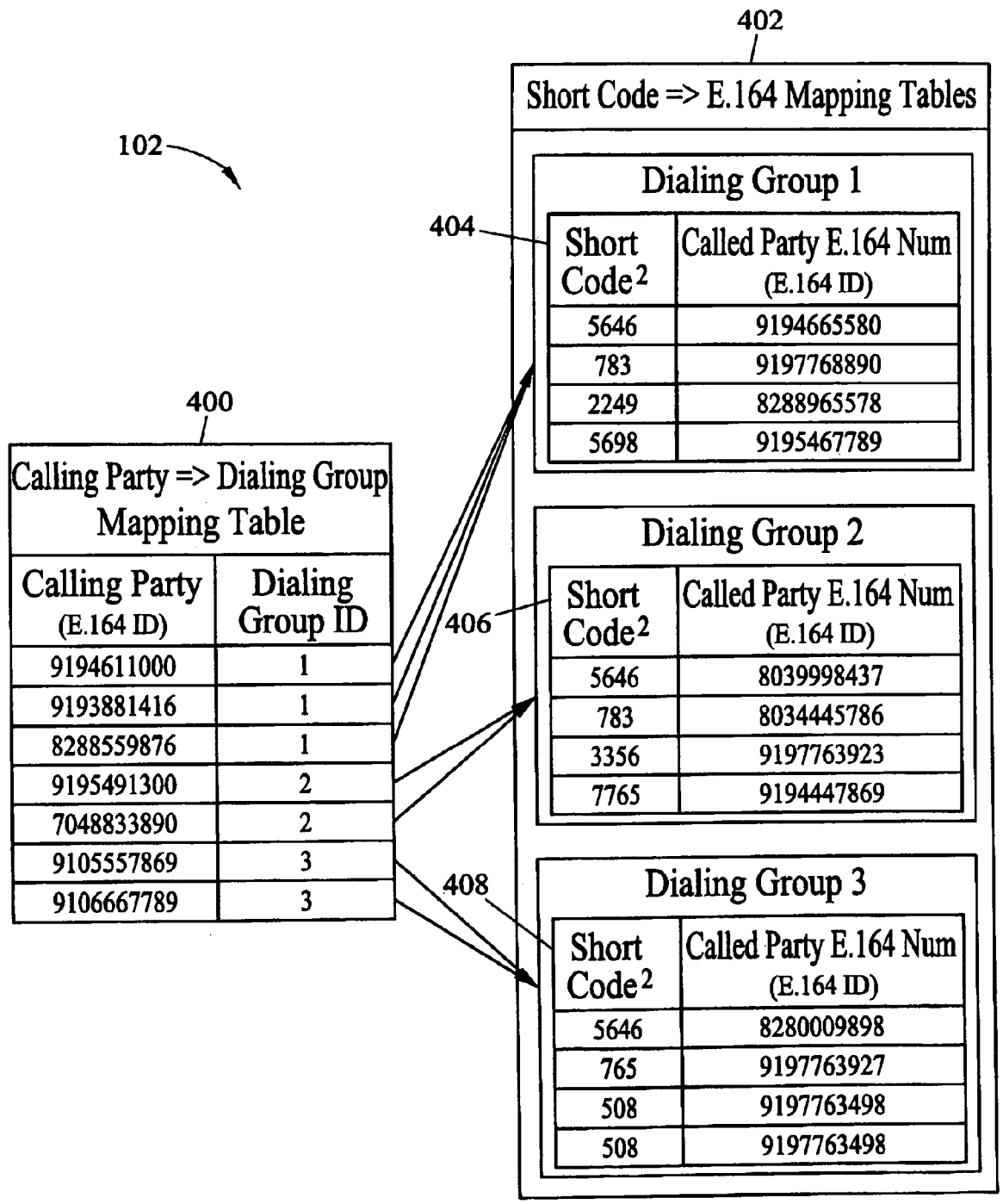
FIG. 4 is a block diagram illustrating exemplary mobile dialing code mapping tables used in the scenarios illustrated in FIGS. 1 and 2.

FIG. 4 illustrates an exemplary mobile dialing code database 102 for the scenarios illustrated in FIGS. 1 and 2 in which SRI and location request messages support calling party digits and SRI messages. Referring to FIG. 4, database 102 includes a calling party-dialing group mapping table 400 and a short code-E.164 address mapping table 402. Calling party-dialing group mapping table 800 maps calling party numbers from SRI and location request messages to dialing group IDs. Short code-E.164 address mapping table 402 maps mobile dialing codes to full called party E.164 numbers for each dialing group. In the illustrated example, separate tables 404, 406, and 408 are included for each dialing group. As a result, dialing codes are not required to be unique across different dialing groups. Because short codes are not required to be unique across dialing groups, customizability by end users and dialing group administrators is enhanced.

The present invention is not limited to the table structure illustrated in FIG. 4. For example, each calling party E.164 ID or range of calling party E.164 IDs may be associated with a dialing group. In such an implementation, the dialing group ID can be eliminated. The calling party E.164 ID and the short code can be used as a combined key to look up the called party E.164 number.

Figure 5:
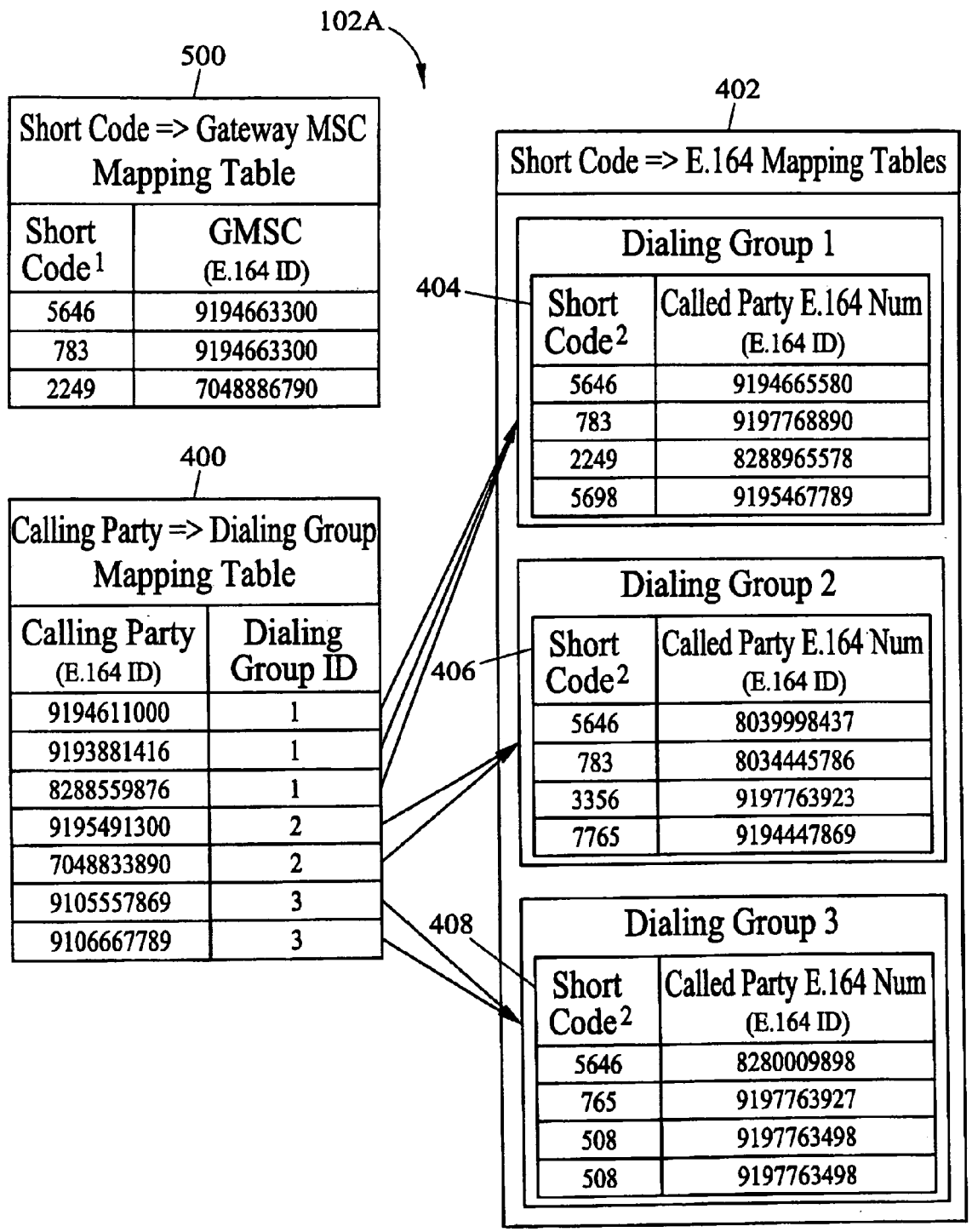
FIG. 5 is a block diagram illustrating exemplary mobile dialing code mapping tables used in the scenario illustrated in FIG. 3.
Figure 6:
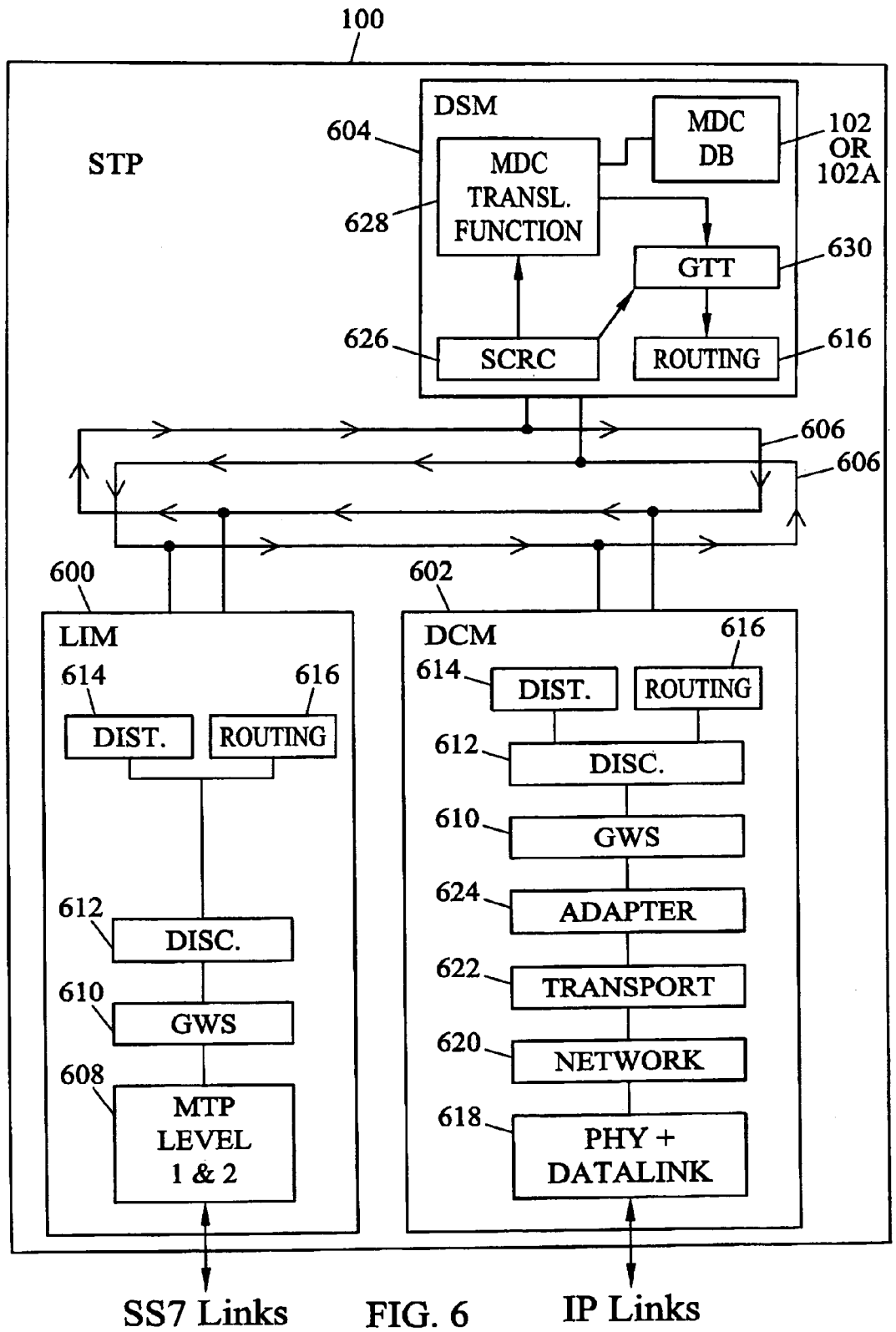
FIG. 6 is a block diagram illustrating an exemplary internal architecture for a signal transfer point implementing triggerless mobile group dialing according to an embodiment of the present invention.

FIG. 5 illustrates exemplary tables that may be used to map mobile dialing codes to full called party E.164 numbers in the scenario described above with regard to FIG. 3 in which the MSCs do not support calling party dialed digits in SRI and location request messages. In FIG. 6, database 102A includes a short code-gateway MSC mapping table 500, a calling party-dialing group mapping table 400, and a short code-E.164 address mapping table 402. Tables 400 and 402 are the same as those previously described with regard to FIG. 4. Table 500 is used to map the short code to a GMSC ID. The purpose of this mapping is to route the second IAM message to a GMSC via STP 100 so that STP 100 can extract the calling party information from the second IAM message. Once the STP has the calling party information, the STP can use the calling party-dialing group mapping table and the short code-E.164 mapping table to map the short code to the full E.164 number of the called party in the manner described above.

FIG. 6 is a block diagram illustrating an exemplary internal architecture of STP 100 for implementing triggerless mobile group dialing according to an embodiment of the present invention. Referring to FIG. 6, STP 100 includes a plurality of processing modules 600, 602, and 604 coupled to each other via a counter rotating dual ring bus 606. From a hardware perspective, each module 600, 602, and 604 may include an application processor for performing application level functions and a communications processor for communicating with other processing modules via bus 606. From a software perspective, each module 600, 602, and 604 may include telecommunications software applications for performing various telecommunications routing and processing functions.

In the illustrated example, module 600 is a link interface module for sending and receiving SS7 messages over SS7 signaling links. A link interface module may include an MTP level 1 and 2 function 608, a gateway screening function 610, a discrimination function 612, a distribution function 614, and a routing function 616. MTP level 1 and 2 function 608 performs MTP level 1 and 2 operations, such as sequencing of SS7 signaling messages, error correction, and error detection. Gateway screening function 610 screens SS7 signaling messages based on originating and/or destination point code values to determine whether or not to allow the signaling messages into a network. Discrimination function 612 determines whether received SS7 messages are addressed to the point code of STP 100 or to an external point code. If discrimination function 612 determines that a message is addressed to the point code of STP 100, discrimination function 612 forwards the signaling message to distribution function 614. If discrimination function 612 determines that a message is addressed to an external point code, discrimination function 612 forwards the signaling message to routing function 616.

Distribution function 614 distributes messages that are identified by discrimination function 612 as requiring further internal processing. For example, distribution function 614 may forward messages addressed to the point code of STP 100 to one of a plurality of identically provisioned DSM modules 604 for GTT or mobile dialing code processing. Routing function 616 includes MTP routing tables for routing messages to the card associated with the outbound signaling link for messages that are identified by discrimination function 612 as being addressed to an external signaling link.

Module 602 is a data communications module (DCM) for sending and receiving SS7 messages over IP signaling links. DCM 602 includes a physical and datalink layer 618, a network layer 620, a transport layer 622, and layers 610 through 616 that are identical to the corresponding layers of LIM 600. Physical and datalink layer 618 performs OSI physical and datalink layer functions, such as framing, error detection and correction, and modulation/demodulation required to send and receive signals over a physical medium. Network layer 620 performs network layer functions, such as IP routing. Transport layer 622 performs functions for ensuring reliable delivery of messages over an unreliable network. Transport layer 622 may implement any suitable transport protocol, such as TCP, SCTP, or UDP. Adaptation layer 624 performs functions for sending and receiving SS7 messages over an underlying IP network. In one example, adaptation layer 624 may implement MTP level 3 user adaptation layer, as described in the correspondingly named IETF RFC.

In FIG. 6, module 604 is a database services module that includes mobile dialing code functions according to the present invention. Database services module 604 includes a signaling connection routing controller 626 for controlling overall processing of SCCP messages. Database services module 604 also includes mobile dialing code translation function 628 for performing the mobile dialing code translations as described above with respect to FIGS. 1–3, a mobile dialing code database 102 or 102A, as described above with respect to FIGS. 4 and 5, a GTT function 630, and a routing function 616. GTT function 630 performs global title translation for messages identified by SCRC 626 as requiring such translation. Routing function 616 routes messages using MTP routing tables as described with regard to LIM 600.

Figure 7:
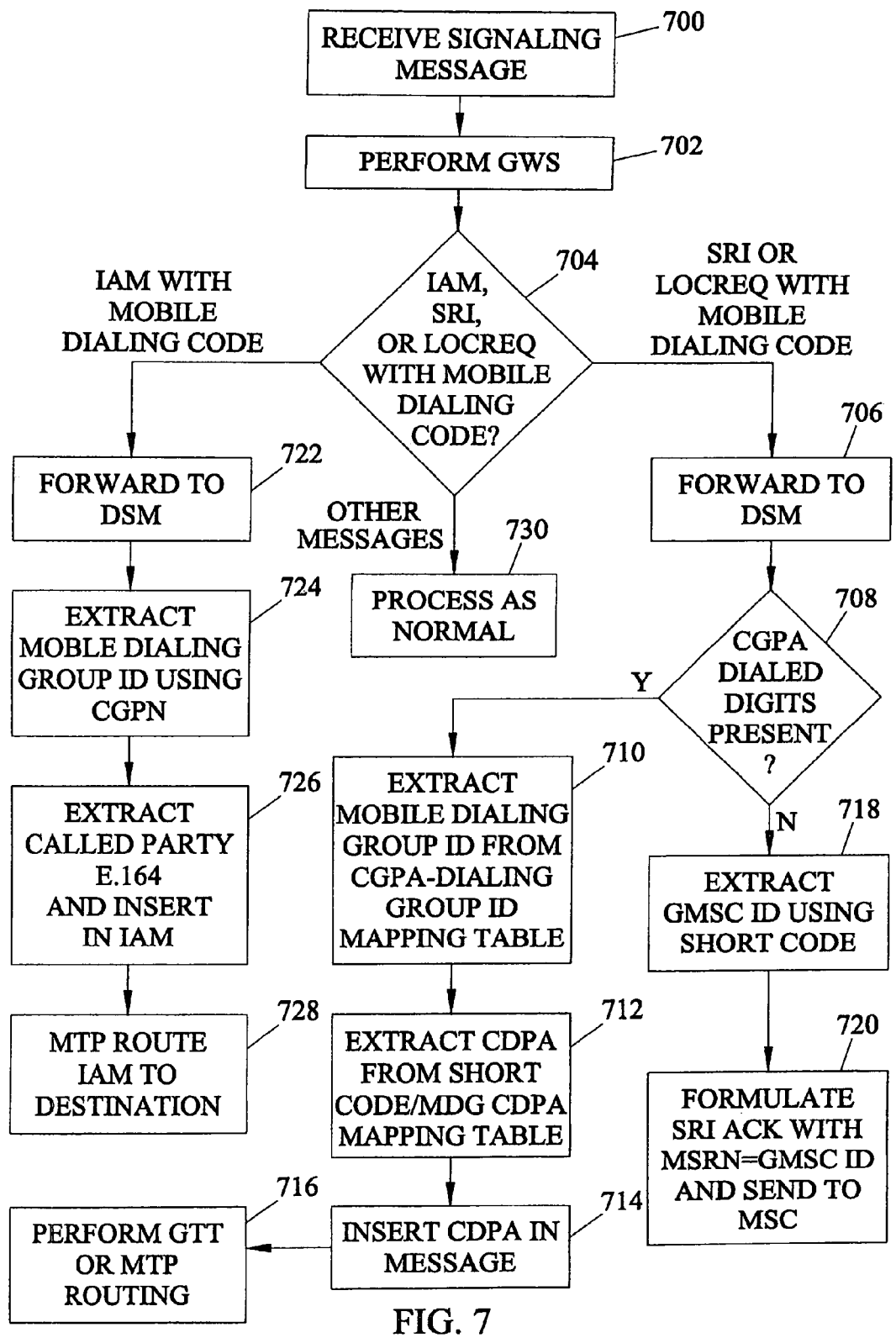
FIG. 7 is a flow chart illustrating exemplary steps for triggerless mobile group dialing according to an embodiment of the present invention.

FIG. 7 is a flow chart illustrating exemplary steps that may be performed by STP 100 in processing and routing messages that include mobile dialing codes according to an embodiment of the present invention. Referring to FIG. 7, in step 700, STP 100 receives a signaling message. In step 702, STP 100 performs gateway screening. Gateway screening involves examining the OPC and the DPC in the message to determine whether to allow the message in the network. If the message is determined not to be allowed in the network, the message is dropped. According to the present invention, gateway screening may be used as an optional filtering mechanism to screen messages that include short codes. For example, gateway screening may be used to identify location request, SRI, and IAM messages that contain short codes and forward those messages to DSM 604 for further processing. If gateway screening determines that these messages do not contain short codes or that the message is of another type, the messages may be processed as normal, thereby avoiding unnecessary mobile dialing code processing.

Gateway screening may exclude SRI, location request, and IAM messages that do not include short codes from triggerless mobile group code processing using any method suitable for identifying whether these messages include short codes. For example, gateway screening or a stand-alone filtering process in STP 100 may examine the called party number parameter in IAM, SRI, and location request messages to determine whether these messages contain short codes. One method for identifying whether the called party address field contains a short code is to set a maximum number of digits for short codes. For example, STP 100 may preprogrammed to identify short codes as having a maximum of five digits. Any number over five digits in length may be assumed to be a full E.164 number. Thus, if the length of the called party number parameter in a received message is less than or equal to the limit, STP 100 will determine that a short code is present and will forward the message to DSM 604 for triggerless mobile dialing code call processing.

Another method for identifying messages with short codes is to use a predetermined parameter, such as the numbering plan parameter, to identify messages with short codes. For example, a special number plan value may be used to identify IAM, SRI, and location request messages as containing short codes. If a received message has the predetermined numbering plan value, STP 100 may identify the message as having a short code and forward the message to DSM 604 for triggerless mobile dialing code processing. If a message does not contain the predetermined parameter, the message may be processed as normal.

The filtering mechanism described in the previous two paragraphs increase performance of STP 100 by eliminating unnecessary triggerless mobile dialing code processing. However, the present invention is not limited to performing such filtering. The filtering may be omitted without departing from the scope of the invention. For example, STP 100 may forward all IAM, SRI, and location request messages to DSM 604 where short code processing may be performed. If the messages do not contain short codes, the lookups in the triggerless mobile dialing code database will result in no match, and the message will fall through to normal GTT processing.

Returning to FIG. 7, in step 704, gateway screening in STP 100 determines whether a received signaling message is an SRI, a location request, or an IAM message with a mobile dialing code. If the message is determined to be an SRI, a location request, or a location request with a mobile dialing code, control proceeds to step 706 where the message is forwarded to a DSM, such as DSM 604 illustrated in FIG. 6. In step 708, DSM 604 determines whether calling party dialed digits are present in the SRI or location request message. If calling party dialed digits are present, control proceeds to step 710 where the DSM extracts the mobile dialing group identifier from the calling party address dialing group identifier mapping table using the calling party dialed digits in the received SRI or location request message. In step 712, DSM 604 extracts the full E.164 called party address from the appropriate short code-E.164 address mapping table. In step 714, the DSM inserts the called party address in the message. In step 716, the DSM card performs global title translation or MTP routing for the SRI or location request message.

Returning to step 708, if calling party dialed digits are determined not to be present in the SRI or location request message, control proceeds to step 718 where DSM 604 extracts the GSM ID using the short code. In step 720, DSM 604 formulates an SRI ACK message with the MSRN parameter being set to the GSMSC ID and sends the SRI ACK message to the requesting MSC.

Returning to step 704, if gateway screening determines that a received message is an IAM message with a short code, control proceeds to step 722 where the IAM message is forwarded to the DSM card. In step 724, DSM 604 extracts the mobile dialing group using the calling party number in the IAM message. In step 726, DSM 604 extracts the called party E.164 address using the mobile dialing group ID and the short code in the IAM message and inserts the E.164 address in the called party address parameter in the IAM message. In step 728, DSM 604 MTP routes the IAM message to its destination.

Returning again to step 704, if gateway screening determines that a received signaling message is not an IAM message, an SRI message, or a location request message with a short code, control proceeds to step 730 where the message is processed as normal. Processing a message as normal may include MTP routing or GTT routing a particular message. Thus, using the steps illustrated in FIG. 3, an STP enables triggerless mobile short code dialing. In addition, because gateway screening may optionally be used to exclude certain messages from short code processing, the processing efficiency of the STP is increased.

Short Code Translation Examples

The examples below illustrate exemplary processing that may be performed by STP 100 equipped with triggerless mobile group dialing functionality according to an embodiment of the present invention.

Scenario 1—Successful Call to/from Dialing Group 1 Subscribers

In this example, it is assumed that a subscriber belonging to Dialing Group 1 with phone number 9194611000 dials short code 5646. It is also assumed the MSC serving the calling party supports calling party digits in the SRI. Referring to FIGS. 1 and 4, the following steps will occur at STP 100:

1. STP 100 receives an SRI from MSC A 104 with SCCP CdPA and MAP MSISDN=5646 and MAP Additional Signal Info (Calling Party)=9194611000.
2. STP 100 searches the Calling Party=>Dialing Group Mapping table, with digits 9194611000 and finds a match with Dialing Group=1.
3. STP 100 then retrieves the short code 5646 from either the SCCP CdPA or MAP MSISDN digits, searches the Short Code=>E.164 Mapping table for Dialing Group 1 and finds a match with E.164=9194665580.
4. STP 100 replaces the short code in the SCCP CdPA and MAP MSISDN parameters with 9194665580 and routes the modified SRI to HLR 108.
5. HLR 108 retrieves current visited MSC information for the called subscriber, returns the SRI_ack to MSC A 104, and the call is completed normally.

Scenario 2—Successful Call to/from Dialing Group 1 Subscribers

For IS-41 calls to/from Dialing Group 1, the following steps will be performed by STP 100:

1. STP 100 receives a LocationRequest from MSC A 200 (FIG. 2) with SCCP CdPA and MAP Dialed Digits=5646 and MAP Calling Party Number Digits=9194611000.
2. STP 100 searches the Calling Party=>Dialing Group Mapping table, with digits 9194611000, and finds a match with Dialing Group=1.
3. STP 100 then retrieves the short code 5646 from either the SCCP CdPA or MAP Dialed Digits, searches the Short Code=>E.164 Mapping table for Dialing Group 1 and finds a match with E.164=9194665580.
4. STP 100 replaces the short code in the SCCP CdPA and MAP Dialed Digits parameters with 9194665580 and routes the modified LocReq to HLR 108.
5. HLR 108 retrieves current visited MSC information for the called subscriber, returns the LocReq Return Result to MSC A 104, and the call is completed normally.

Scenario 3—Successful Call to/from Dialing Group 1 Subscribers

This example assumes that the MSC cannot place calling party information in the SRI or LocReq. In such a situation, STP 100 will perform the following steps:

1. STP 100 receives an SRI from MSC A 104 (FIG. 3) with CdPA=5646.
2. STP 100 searches the Short Code=>Gateway MSC Mapping table, and finds a match with GMSC ID=9194663300.
3. STP 100 returns an SRI_ack to MSC A 104 with MSRN=9194663300.
4. MSC A 104 sends an IAM message to GMSC 300 identified by 9194663300 via STP 100. The IAM contains CdPN=5646 and CgPN=9194611000. MSC A 104 also sets up voice trunk to GMSC 300 identified by 9194663300.
5. STP 100 receives the IAM, retrieves the CgPN digits (9194611000), searches the Calling Party=>Dialing Group Mapping table, and finds a match with Dialing Group=1.
6. STP 100 then retrieves the short code 5646 from the IAM CdPN digits, searches the Short Code=>E.164 Mapping table for Dialing Group 1, and finds a match with E.164=9194665580.
7. STP 100 replaces the short code in the CdPN digits with 9194665580 and routes the modified IAM to GMSC 300.
8. STP 100 then receives an SRI from GMSC 300 with CdPA=9194665580.
9. STP 100 searches the Short Code=>Gateway MSC Mapping table, does not find a match. The message therefore falls through to standard STP 100 processing (either standard GTT, application-specific GTT, depending upon the service selectors present in the SRI).

10. The SRI is relayed to HLR 108, which retrieves current visited MSC information for the called subscriber, returns the SRI_ack to the GMSC 300, and the call is completed normally.

Successful Call to/from Dialing Group 2 Subscribers—Duplicated Short Code

In this example, a subscriber belonging to Dialing Group 2 with phone number 9195491300 dials short code 5646. This short code is the same as that dialed by the Dialing Group 1 subscriber in Scenario 1 described above. The following steps will occur at the STP 100. Differences from the previous example are shown in bold and underlined.

1. STP 100 receives an SRI from MSC A 104 with SCCP CdPA and MAP MSISDN=5646 and MAP Additional Signal Info (Calling Party)=9195491300.
2. STP 100 searches the Calling Party=>Dialing Group Mapping table, with digits 9195491300, and finds a match with Dialing Group=2.
3. STP 100 then retrieves the short code 5646 from either the SCCP CdPA or MAP MSISDN digits, searches the Short Code=>E.164 Mapping table for Dialing Group 2, and finds a match with E.164=8039998437.
4. STP 100 replaces the short code in the SCCP CdPA and MAP MSISDN parameters with 8039998437 and routes the modified SRI to HLR 108.
5. HLR 108 retrieves current visited MSC information for the called subscriber, returns the SRI_ack to MSC A 104, and the call is completed normally.

Thus, this example illustrates the enhanced customizability provided by STP 100 according to the present invention. By using group IDs to differentiate between mobile dialing groups, subscribers within each group can freely assign mobile dialing codes to called party numbers without concern for mobile dialing codes assigned by subscribers in other dialing groups.

Unsuccessful Call Attempt Scenarios

The following scenarios illustrate exemplary processing that may be performed by an STP with triggerless mobile group dialing functionality when a subscriber dials a short code that is not provisioned for the subscriber's mobile dialing group.

Scenario 1—Unsuccessful Call Attempt from Dialing Group 3 Subscriber to a Short Code not in Group 3

In this example, a subscriber belonging to Dialing Group 3 with phone number 9196667789 attempts to dial a short code (783) that is active in Dialing Group 1 but not active in Dialing Group 3. In this example, it is assumed that users can only dial short codes for subscribers within their same dialing group. However, the present invention is not limited to such an implementation. The database structure in STP 100 allows a subscriber to assign a short code to any mobile subscriber, regardless of whether the mobile subscriber is within the assigning subscriber's dialing group. For example, such subscriber assignment may be used in an implementation where direct calling party+short code-to-full E.164 called party mapping is used instead of mobile group IDs. For the case where a subscriber dials a short code that is not assigned to any other subscribers within the dialing subscriber's dialing group, STP 100 may perform the following steps:

1. STP 100 receives an SRI from MSC A 104 with SCCP CdPA and MAP MSISDN=783 and MAP Additional Signal Info (Calling Party)=9196667789.
2. STP 100 searches the Calling Party=>Dialing Group Mapping table, with digits 9196667789 and finds a match with Dialing Group=3.
3. STP 100 then retrieves the short code 783 from either the SCCP CdPA or MAP MSISDN digits, searches the Short Code=>E.164 Mapping table for Dialing Group 3, and does not find a match.
4. Since no match is found, STP 100 simply relays the unmodified SRI to HLR 108.
5. HLR 108 will also not find a match because subscriber records in HLRs are indexed based on full subscriber numbers, rather than short codes. Therefore, HLR 108 will return an SRI-ack response to MSC A 104 with User Error=Unknown Subscriber (or other appropriate error). This will cause MSC A 104 to terminate the call.

Scenario 2—Unsuccessful IS-41 Call Attempt from Dialing Group 3 Subscriber to a Short Code not in Group 3

In this scenario, STP 100 will perform the following steps:

1. STP 100 receives a LocationRequest from MSC A 200 with SCCP CdPA and MAP Dialed Digits=783 and MAP Calling Party Number Digits=9196667789.
2. STP 100 searches the Calling Party=>Dialing Group Mapping table, with digits 9196667789, and finds a match with Dialing Group=3.
3. STP 100 then retrieves the short code 783 from either the SCCP CdPA or MAP Dialed Digits, searches the Short Code=>E.164 Mapping table for Dialing Group 3, and does not find a match.
4. Since no match is found, STP 100 simply relays the unmodified LocReq to HLR 108.
5. HLR 108 will also not find a match because HLR records are indexed by full subscriber numbers, rather than short codes. HLR 108 will thus send a LocationRequest Return Result to MSC A 200 with Access Denied Reason=Unassigned Directory Number (or other appropriate error). This will cause MSC A 200 to terminate the call.

Scenario 3—Unsuccessful Call Attempt from Dialing Group 3 Subscriber to a Short Code not in Group 3

In this scenario, STP 100 will perform the following steps:

1. STP 100 receives an SRI from MSC A 104 with CdPA=783.
2. STP 100 searches the Short Code=>Gateway MSC Mapping table, and finds a match with GMSC ID=9194663300.
3. STP 100 returns an SRI_ack to MSC A 104 with MSRN=9194663300.
4. MSC A 104 sends IAM to GMSC identified by 9194663300 via STP 100. IAM contains CdPN=783 and CgPN=9196667789. MSC A 104 also sets up voice trunk to the GMSC identified by 9194663300.
5. STP 100 receives the IAM, retrieves the CgPN digits (9196667789), searches the Calling Party=>Dialing Group Mapping table, and finds a match with Dialing Group=3.
6. STP 100 then retrieves the short code 783 from the IAM CdPN digits, searches the Short Code=>MSISDN Mapping table for Dialing Group 3, and does not find a match.

7. STP 100 then generates an ISUP Release (REL) message and sends the REL message back to MSC A 104. This will inform MSC A 104 to tear down the voice trunks and terminate the call attempt.

Calls to a Full E.164 Number

In the following examples, a call is placed to a standard E.164 number, rather than a short code. The purpose of these examples is to show how the STP 100 would handle standard dialing when the triggerless mobile group dialing (TMGD) feature has been activated.

Option 1—No Additional Filtering Mechanism

The following scenarios illustrate exemplary processing that may be performed by STP when no filtering mechanism is in place to filter messages from unnecessary triggerless mobile group dialing processing.

Scenario 1
1. STP 100 receives an SRI from MSC A 104 with SCCP CdPA and MAP MSISDN=9194665580 (full E.164 number) and MAP Additional Signal Info (Calling Party) =9194611000.
2. The Calling Party=>Dialing Group Mapping table is searched and match is found with Dialing Group 1.
3. STP 100 searches the Short Code=>E.164 Mapping table for Dialing Group 1 with 9194665580, and does not find a match.
6. Since no match is found, STP 100 simply relays the unmodified SRI to HLR 108.
4. HLR 108 will follow normal processing and the call will be completed.

Scenario 2
1. STP 100 receives a LocReq message from MSC A 200 with SCCP CdPA and MAP Dialed Digits=9194665580 (full E.164 number) and MAP Calling Party Digits=9194611000.
2. The Calling Party=>Dialing Group Mapping table is searched and match is found with Dialing Group 1.
3. STP 100 searches the Short Code=>E.164 Mapping table for Dialing Group 1 with 9194665580, and does not find a match.
7. Since no match is found, STP 100 simply relays the unmodified LocReq to HLR 108.
4. HLR 108 will follow normal processing and the call will be completed.

Scenario 3
5. STP 100 receives an SRI from MSC A 104 with CdPA=9194665580 (full E.164 number).
6. STP 100 searches the Short Code=>Gateway MSC Mapping table, and does not find a match.
7. STP 100 relays the SRI to HLR 108; HLR 108 responds to MSC A 104 with the visited MSC for the called party (MSC B 106).
8. MSC A 104 sends an IAM to MSC B 106 via STP 100 and sets up a voice trunk to MSC B 106 (CgPN=9194611000).
9. STP 100 intercepts the IAM based on OPC/DPC in GWS and forwards to DSM 604 for triggerless mobile dialing code processing.
10. The Calling Party=>Dialing Group Mapping table is searched and match is found with Dialing Group 1.
11. STP 100 searches the Short Code=>MSISDN Mapping table for Dialing Group 1 with 9194665580 and does not find a match.
12. Since no match is found, STP 100 simply routes the IAM based on MTP routing label information, and the call is completed to MSC B 106.

Option 2—Use of Digit Length Filtering

When the length of the called party address is used as a filter for short code processing, STP 100 will perform the following steps:
1. STP 100 receives an SRI from MSC A 104 with CdPA=9194665580 (full E.164 number).
2. It is assumed in this example that STP 100 has been set up to trigger TMGD processing for SRIs, Loc_Reqs, and IAMs containing short codes of 5 digits or less.
3. STP 100 examines CdPA in the SRI and determines it is greater than 5 digits; therefore, short code processing is not triggered.
4. STP 100 relays the SRI to HLR 108; HLR 108 responds to MSC A 104 with the visited MSC for the called party (MSC B 106).
5. MSC A 104 sends an IAM to MSC B 106 via the STP 100 and sets up a voice trunk to MSC B 106 (CgPN=9194611000).
6. STP 100 intercepts the IAM based on OPC/DPC in GWS, examines the length of the CdPN parameter, determines the length is greater than 5 digits, and therefore TMGD processing is not triggered.
7. STP 100 simply routes the IAM based on MTP routing label information, call completes to MSC B 106.

Option 3—Use of Special NP Value

When a predetermined number plan value is used to indicate the presence of a short code, STP 100 will perform the following steps:
1. STP 100 receives an SRI from MSC A 104 with CdPA=9194665580 (full E.164 number). In this example, it is assumed that the CdPA NP value has been set to special "short code" value of 126.
2. STP 100 examines CdPA NP in the SRI and determines it is a special 126 value; therefore, TMGD processing is not triggered.
3. STP 100 relays the SRI to HLR 108; HLR 108 responds to MSC A 104 with the visited MSC for the called party (MSC B 106).
4. MSC A 104 sends an IAM to MSC B 106 via the STP 100 and sets up a voice trunk to MSC B 106 (CgPN=9194611000).
5. STP 100 intercepts the IAM based on OPC/DPC in GWS, examines the CdPN NP parameter, determines it contains the special value 126, and therefore TMGD processing is not triggered.
6. STP 100 simply routes the IAM based on MTP routing label information, call completes to MSC B 106.

Although the examples discussed above illustrate triggerless mobile dialing code processing being performed for SS7 signaling messages sent over SS7 signaling links, the present invention is not limited to sending such messages over SS7 signaling links. The methods and systems described herein can be used to perform triggerless mobile dialing code processing for SS7 signaling messages sent over IP or ATM signaling links and for non-SS7 call signaling messages, including packet telephony call signaling messages. Examples of packet telephony call signaling messages that may be intercepted include SIP messages, H.323 messages, or any other suitable type of packet telephony call signaling messages that contain mobile dialing codes.

Applications

Business Users

With a business, the ability to dial a short code to reach a colleague is a very powerful feature. Today, this is possible from wireline phone to another wireline phone via a PBX. However, the PBX does not allow a user to dial a short code from a wireline phone and reach a colleague on a mobile phone. In addition, a PBX does not allow dialing from a mobile phone or from a wireline phone not directly connected to the PBX. Finally, short codes defined by a PBX cannot be customized.

With the triggerless mobile dialing group feature of the present invention, a business can establish a dialing group and assign a customized phone number or short code to each employee with a mobile phone. The short code can be dialed from any phone designated as belonging to the dialing group, including wireline desk phones within the office, wireline phones outside of the office (e.g., the employee's home phones), or other mobile phones. This allows all employees to reach all other employees within the group from any number of locations.

Many offices provide online phone books (e.g., using Lotus Notes or Microsoft Outlook), and most mobile phones have phone book capabilities. These features allow employees to quickly find and dial the true E.164 number of another employee. However, when an employee is traveling and does not have access to the companies online phonebook and needs to contact someone who is not programmed into the employee's mobile phone, without the present invention, the employee will not be able to contact the desired group member. With the triggerless mobile group dialing feature, the employee may simply dial the persons name and immediately be connected.

Consumer/Personal Users

Most mobile phones have some address book capabilities. However, most wireline phones do not have address book capabilities. Thus, the triggerless mobile group dialing feature of the present invention can be useful for consumers to complete calls to mobile subscribers from wireline phones. In addition, the phone book features in many mobile phones require multiple keystrokes and searches to locate the dialed party. The triggerless mobile group dialing feature of the present invention eliminates the need to access multiple menus and perform searches when dialing a short code from a mobile phone.

Uses of Short Code/Customized Numbering Plans

One advantage of the triggerless mobile group dialing feature of the present invention is not only to assign mobile dialing codes, but also to use customized numbering plans for mobile dialing codes. A typical PBX simply truncates the full E.164 number down to four or five digits, and the truncated number is used as the short code. There is no customization possible.

Triggerless mobile group dialing of the present invention allows short codes within a dialing group to be any combination of customized digits, including a person's name. In one example, to reach someone named John Doe within a particular dialing group, a user may simply dial the digits corresponding to "John," or 5646. The triggerless mobile group dialing feature of the present invention also supports mobile dialing codes of differing lengths within the same dialing group. Thus, to reach someone named Sue B. within the same group, a user may dial the digits corresponding to "Sue," or 783. Providing variable digits support also allows one or more users within a group to have the same name. For example, if there is a John Doe and a John Smith within the same group, short codes for these two users may be the digits corresponding to "John D." and "John S." or 56469 and 56467, respectively. If short codes correspond to names, some names may have identical short codes. For example, the short code for both "Jim" and "Kim" would be 546. However, due to the variable digit nature of this feature, this problem can be resolved by adding characters from the last name.

Thus, as described above, the present invention includes methods and systems for triggerless mobile dialing code processing. Signaling messages relating to calls to mobile subscribers and that contain mobile dialing codes are intercepted. The mobile dialing codes in the signaling messages are translated into full called party addresses. The signaling messages are modified to include the called party addresses and are routed to their intended destinations. Because signaling messages are intercepted and modified, the need for end office triggers and AIN processing is reduced. As a result, signaling message traffic and call setup time are also reduced.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for triggerless mobile group dialing, the method comprising:
   at a signaling message routing node comprising a signal transfer point (STP) for routing call setup and mobile subscriber routing information request messages between other nodes in a network:
   (a) receiving and routing a plurality of call signaling messages;
   (b) intercepting, from the plurality of call signaling messages, a call signaling message for a call directed to a mobile dialing code used to identify a called mobile subscriber within a mobile dialing group;
   (c) determining a called party address based on the mobile dialing code;
   (d) replacing the mobile dialing code in the message with the called party address; and
   (e) routing the call signaling message to its intended destination.

2. The method of claim 1 wherein intercepting a call signaling message includes intercepting a send routing information message.

3. The method of claim 1 wherein intercepting a call signaling message includes intercepting a location request message.

4. The method of claim 1 wherein intercepting a call signaling message includes intercepting an IAM message.

5. The method of claim 1 wherein intercepting a call signaling message includes intercepting a call signaling message including calling party dialed digits and wherein determining a called party address based on the mobile dialing code includes determining a called party address based on a mobile dialing group ID associated with the calling party dialed digits and the mobile dialing code.

6. A method for triggerless mobile group dialing, the method comprising:

at a signaling message routing node:
- (a) receiving and routing a plurality of call signaling messages;
- (b) intercepting, from the plurality of call signaling messages, a call signaling message for a call directed to a mobile dialing code used to identify a called mobile subscriber within a mobile dialing group;
- (c) determining a called a party address based on the mobile dialing code;
- (d) replacing the mobile dialing code in the message with the called party address; and
- (e) routing the call signaling message to its intended destination, wherein intercepting a call signaling message includes intercepting a call signaling message including calling party dialed digits and wherein determining a called party address based on the mobile dialing code includes determining a called party address based on the combination of the calling party dialed digits and the mobile dialing code without using a mobile dialing group ID.

7. The method of claim 6 wherein the mobile dialing group comprises a subscriber-specific dialing group corresponding to the calling party dialed digits.

8. The method of claim 6 wherein the mobile dialing group corresponds to a range of digits in which the calling party dialed digits fall.

9. A method for triggerless mobile group dialing, the method comprising:

at a signaling message routing node:
- (a) receiving and routing a plurality of call signaling messages;
- (b) intercepting, from the plurality of call signaling messages, a call signaling messacie for a call directed to a mobile dialing code used to identify a called mobile subscriber within a mobile dialing group;
- (c) determining a called party address based on the mobile dialing code;
- (d) replacing the mobile dialing code in the message with the called party address; and
- (e) routing the call signaling message to its intended destination, wherein intercepting a call signaling message includes intercepting a call signaling message that does not include calling party dialed digits and wherein determining a called party address includes forcing an originating switch to send an IAM message to a gateway mobile switching center, extracting calling party dialed digits from the IAM message, and wherein determining a called party address based on the mobile dialing group and the mobile dialing code includes determining the called party address based on a mobile dialing group ID associated with the calling party dialed digits and the mobile dialing code.

10. A method for triggerless mobile group dialing, the method comprising:

at a signaling message routing node;
- (a) receiving and routing a plurality of call signaling messages;
- (b) intercepting, from the plurality of call signaling messages, a call signaling message for a call directed to a mobile dialing code used to identify a called mobile subscriber within a mobile dialing group;
- (c) determining a called party address based on the mobile dialing code;
- (d) replacing the mobile dialing code in the message with the called party address; and
- (e) routing the call signaling message to its intended destination, wherein intercepting a call signaling message includes intercepting a call signaling message that does not include calling party dialed digits and wherein determining, a called party address includes forcing an originating switch to send an IAM message to a gateway mobile switching center, extracting calling party dialed digits from the IAM message, and wherein determining a called party address based on the mobile dialing code includes determining the called party address based the combination of calling party dialed digits and the mobile dialing code without using a mobile dialing group ID.

11. The method of claim 1 wherein intercepting a call signaling message includes intercepting a call signaling message addressed to the STP.

12. The method of claim 1 wherein intercepting a call signaling message includes intercepting a mobile call signaling message addressed to an HLR.

13. The method of claim 1 wherein determining a called party address includes determining a called party address without querying an intelligent network (IN) or CAMEL database external to the routing node.

14. The method of claim 1 wherein determining a called party address includes determining an E.164 address for the mobile call signaling message.

15. The method of claim 1 wherein routing the call signaling message to its intended destination includes performing global title translation using the called party address and routing the call signaling message based on the result of the global title translation.

16. The method of claim 1 wherein routing the call signaling message to its intended destination includes message transfer part (MTP) routing the call signaling message to its intended destination.

17. The method of claim 1 comprising screening call signaling messages that do not have short codes and excluding these messages from short code processing as defined by steps (b)–(e).

18. The method of claim 17 wherein screening call signaling messages that do not have short codes includes examining a numbering plan parameter in the mobile call signaling messages.

19. The method of claim 17 wherein screening the call signaling messages that do not have short codes includes examining the length of the called party address in the call signaling messages.

20. A signaling message routing node comprising a signal transfer point (STP) and for routing call setup and mobile subscriber routing information request messages between other nodes in a network and for triggerless mobile group dialing, the signaling message routing node comprising:
- (a) a communications module in the signaling message routing node for sending and receiving signaling messages and for intercepting signaling messages relating to calls directed to mobile subscribers and requiring triggerless mobile dialing group processing;
- (b) a triggerless mobile dialing code translation function in the signaling message routing node and operatively associated with the communications module for receiving the signaling messages requiring triggerless mobile dialing group processing and for translating mobile dialing codes in the signaling messages to called party addresses based on mobile dialing groups associated with the signaling messages;
- (c) a mobile dialing code database in the signaling message routing node and accessible by the triggerless mobile dialing code translation function and including information for translating the mobile dialing codes to called party addresses; and (d) a routing function in the signaling message routing node for routing the signaling messages with the called party addresses to their intended destinations.

21. The signaling message routing node of claim 20 wherein the communications module is adapted to intercept predetermined SS7 call signaling messages sent over SS7 signaling links for triggerless mobile dialing code processing.

22. The signaling message routing node of claim 20 wherein the communications module is adapted to intercept predetermined SS7 call signaling messages sent over IP signaling links for triggerless mobile dialing code processing.

23. A signaling message routing node for triggerless mobile group dialing, the signaling message routing node comprising:
   (a) a communications module for sending and receiving signaling messages and for intercepting signaling messages relating to calls directed to mobile subscribers and requiring triggerless mobile dialing group processing;
   (b) a triggerless mobile dialing code translation function operatively associated with the communications module for receiving the signaling messages requiring triggerless mobile dialing group processing and for translating mobile dialing codes in the signaling messages to called party addresses based on mobile dialing groups associated with the signaling messages; and
   (c) a mobile dialing code database accessible by the triggerless mobile dialing code translation function and including information for translating the mobile dialing codes to called party addresses, wherein the communications module is adapted to intercept predetermined IP telephony call signaling messages for triggerless mobile dialing code processing.

24. The signaling message routing node of claim 20 wherein the triggerless mobile dialing code translation function is adapted to determine a mobile dialing group ID associated with each of the intercepted signaling messages and to translate the mobile dialing code in each intercepted signaling message into a called party address using the mobile dialing code and the mobile dialing group ID.

25. The signaling message routing node of claim 20 wherein the triggerless mobile dialing code translation function is adapted to extract a calling party address from each of the intercepted signaling messages and to translate the mobile dialing code in each intercepted signaling message into a called party address using the mobile dialing code and the calling party address combination.

26. The signaling message routing node of claim 25 wherein the mobile dialing group comprises a subscriber-specific dialing group corresponding to the calling party dialed digits.

27. The signaling message routing node of claim 25 wherein the mobile dialing group corresponds to a range of digits in which the calling party dialed digits fall.

28. A signaling message routing node for triggerless mobile group dialing, the signaling message routing node comprising:
   (a) a communications module for sending and receiving signaling messages and for intercepting signaling messages relating to calls directed to mobile subscribers and requiring triggerless mobile dialing group processing;
   (b) a triggerless mobile dialing code translation function operatively associated with the communications module for receiving the signaling messages requiring trigger less mobile dialing group processing and for translating mobile dialing codes in the signaling messages to called party addresses based on mobile dialing groups associated with the signaling messages; and
   (c) a mobile dialing code database accessible by the triggerless mobile dialing code translation function and including information for translating the mobile dialing codes to called party addresses, wherein the triggerless mobile dialing code translation function is adapted to intercept first call signaling messages that include mobile dialing codes and that do not contain calling party addresses, to force originators of the first call signaling messages to send second call signaling messages that include mobile dialing codes and calling party addresses, and to translate the mobile dialing codes in the second call signaling messages into called party addresses using the calling party addresses and the mobile dialing codes.

29. The signaling message routing node of claim 20 wherein the mobile dialing code database includes a first table for mapping calling party information to dialing group IDs and a second table for mapping mobile dialing codes and dialing group IDs to called party numbers.

30. A signaling message routing node for triggerless mobile group dialing, the signaling message round node comprising:
   (a) a communications module for sending and receiving signaling messages and for intercepting signaling messages relating to calls directed to mobile subscribers and requiring triggerless mobile dialing group processing;
   (b) a triggerless mobile dialing code translation function operatively associated with the communications module for receiving the signaling messages requiring triggerless mobile dialing group processing and for translating mobile dialing codes in the signaling messages to called party addresses based on mobile dialing groups associated with the signaling messages; and
   (c) a mobile dialing code database accessible by the triggerless mobile dialing code translation function and including information for translating the mobile dialing codes to called party addresses, wherein the mobile dialing code database includes a first table for mapping calling party information to dialing group IDs and a second table for mapping mobile dialing codes and dialing group IDs to called party numbers, and wherein the mobile dialing code translation database includes a third table for mapping mobile dialing codes to gateway mobile switching center (GMSC) identifiers.

31. The signaling message routing node of claim 20 comprising a gateway screening function operatively associated with the communications module for screening messages for mobile dialing code translation processing.

32. The signaling message routing node of claim 31 wherein the gateway screening function is adapted to exclude messages from mobile dialing code translation processing in response to determining that the signaling messages do not include mobile dialing codes.

33. The signaling message routing node of claim 31 wherein the gateway screening function is adapted to exclude messages from mobile dialing code translation processing based on the length of a called party dialed digits parameter in each of the messages.

34. The signaling message routing node of claim 31 wherein the gateway screening function is adapted to exclude messages from mobile dialing code translation processing based on numbering plan parameter in each of the messages.

35. The signaling message routing node of claim 20 wherein the communications module, the mobile dialing code translation function, and the mobile dialing code translation database are components of the signal transfer point.

36. The signaling message routing node of claim 20 wherein the signaling message routing node further comprises an SS7/IP gateway.

37. The signaling message routing node of claim 20 wherein the mobile dialing codes in the mobile dialing code translation database are customizable by end users.

38. The signaling message routing node of claim 20 wherein the triggerless mobile dialing group translation function is adapted to obtain the called party address without querying an intelligent network (IN) or CAMEL database external to the signaling message routing node.

39. A computer program product comprising computer-executable instructions embodied in a computer-readable medium for performing steps comprising:
   at a signaling message routing node comprising a signal transfer point (STP) for routing call setup and mobile subscriber routing information request messages between other nodes in a network:
   (a) receiving and routing a plurality of call signaling messages;
   (b) intercepting, from the plurality of call signaling messages, a call signaling message for a call directed to a mobile dialing code used to identify a called mobile subscriber within a mobile dialing group;
   (c) determining a called party address based on the mobile dialing code;
   (d) replacing the mobile dialing code in the message with the called party address; and
   (e) routing the call signaling message to its intended destination.

40. The computer program product of claim 39 wherein intercepting a call signaling message includes intercepting a send routing information message.

41. The computer program product of claim 39 wherein intercepting a call signaling message includes intercepting a location request message.

42. The computer program product of claim 39 wherein intercepting a call signaling message includes intercepting an IAM message.

43. The computer program product of claim 39 wherein intercepting a call signaling message includes intercepting a call signaling message including calling party dialed digits and wherein determining a called party address based on the mobile dialing code includes determining a called party address based on a mobile dialing group ID associated with the calling party dialed digits and the mobile dialing code.

44. A computer program product comprising computer-executable instructions embodied in a computer-readable medium for performing steps comprising:
   (a) receiving and routing a plurality of call signaling messages;
   (b) intercepting, from the plurality of call signaling messages, a call signaling message for a call directed to a mobile dialing code used to identify a called mobile subscriber within a mobile dialing group;
   (c) determining a called party address based on the mobile dialing code;
   (d) replacing the mobile dialing code in the message with the called party address; and
   (e) routing the call signaling message to its intended destination, wherein intercepting a call signaling message includes intercepting a call signaling message including calling party dialed digits and wherein determining a called party address based on the mobile dialing code includes determining a called party address based on the combination of calling party dialed digits and the mobile dialing code.

45. The computer program product of claim 44 wherein the mobile dialing group comprises a subscriber-specific dialing group corresponding to the calling party dialed digits.

46. The computer program product of claim 44 wherein the mobile dialing group corresponds to a range of digits in which the calling party dialed digits fall.

47. A computer program product comprising computer-executable instructions embodied in a computer-readable medium for performing steps comprising:
   (a) receiving and routing a plurality of call signaling messages;
   (b) intercepting, from the plurality of call signaling messages, a call signaling message for a call directed to a mobile dialing code used to identify a called mobile subscriber within a mobile dialing group;
   (c) determining a called party address based on the mobile dialing code;
   (d) replacing the mobile dialing code in the message with the called party address; and
   (e) routing the call signaling message to its intended destination, wherein intercepting a call signaling message includes intercepting a call signaling message that does not include calling party dialed digits and wherein determining a called party address includes forcing an originating switch to send an IAM message to a gateway mobile switching center, extracting calling party dialed digits from the IAM message, and wherein determining a called party address based on the mobile dialing group and the mobile dialing code includes determining the called party address based on a mobile dialing group ID associated with the calling party dialed digits and the mobile dialing code.

48. A computer program product comprising computer-executable instructions embodied in a computer-readable medium for performing steps comprising:
   (a) receiving and routing a plurality of call signaling messages;
   (b) intercepting, from the plurality of call signaling messages, a call signaling message for a call directed to a mobile dialing code used to identify a called mobile subscriber within a mobile dialing group;
   (c) determining a called party address based on the mobile dialing code;
   (d) replacing the mobile dialing code in the message with the called party address; and
   (e) routing the call signaling message to its intended destination, wherein intercepting a call signaling message includes intercepting a call signaling message that does not include calling party dialed digits and wherein determining a called party address includes forcing an originating switch to send an IAM message to a gateway mobile switching center, extracting calling party dialed digits from the IAM message, and wherein determining a called party address based on the mobile dialing group and the mobile dialing code includes determining the called party address based the calling party dialed digits and the mobile dialing code.

49. The computer program product of claim 39 wherein intercepting a call signaling message includes intercepting a call signaling message addressed to the STP.

50. The computer program product of claim 39 wherein intercepting a call signaling message includes intercepting a mobile call signaling message addressed to an HLR.

51. The computer program product of claim 39 wherein determining a called party address includes determining an E.164 address for the mobile call signaling message.

52. The computer program product of claim 39 wherein routing the call signaling message to its intended destination includes performing global title translation using the called party address and routing the call signaling message based on the result of the global title translation.

53. The computer program product of claim 39 wherein routing the call signaling message to its intended destination includes message transfer part (MTP) routing the call signaling message to its intended destination.

54. The computer program product of claim 39 comprising screening call signaling messages that do not have short codes and excluding these messages from short code processing as defined by steps (b)–(e).

55. The computer program product of claim 54 wherein screening call signaling messages that do not have short codes includes examining a numbering plan parameter in the mobile call signaling messages.

56. The computer program product of claim 54 wherein screening the call signaling messages that do not have short codes includes examining the length of the called party address in the call signaling messages.

57. The computer program product of claim 39 wherein determining a called party address includes determining a called party address without querying an intelligent network (IN) or CAMEL database external to the routing node.

* * * * *